(12) United States Patent
Bell

(10) Patent No.: US 10,282,273 B1
(45) Date of Patent: May 7, 2019

(54) APPLICATION MONITORING USING WORKLOAD METADATA

(71) Applicant: Mesosphere, Inc., San Francisco, CA (US)

(72) Inventor: Aaron Justin Bell, Brooklyn, NY (US)

(73) Assignee: Mesosphere, Inc., San Francisco, CA (US)

( * ) Notice: Subject to any disclaimer, the term of this patent is extended or adjusted under 35 U.S.C. 154(b) by 0 days.

(21) Appl. No.: 15/226,874

(22) Filed: Aug. 2, 2016

Related U.S. Application Data

(60) Provisional application No. 62/202,066, filed on Aug. 6, 2015.

(51) Int. Cl.
  *G06F 11/36* (2006.01)
  *G06F 8/70* (2018.01)

(52) U.S. Cl.
  CPC ............ *G06F 11/3608* (2013.01); *G06F 8/70* (2013.01)

(58) Field of Classification Search
  None
  See application file for complete search history.

(56) References Cited

U.S. PATENT DOCUMENTS

| | | | | |
|---|---|---|---|---|
| 8,997,091 B1* | 3/2015 | Watson | ..................... | G06F 8/60 717/170 |
| 2008/0222631 A1* | 9/2008 | Bhatia | ................. | G06F 11/3604 717/178 |
| 2011/0093701 A1* | 4/2011 | Etchegoyen | .......... | G06F 21/121 713/165 |
| 2011/0258605 A1* | 10/2011 | Ioannou | .................... | G06F 8/77 717/126 |
| 2012/0291018 A1* | 11/2012 | Peri | .......................... | G06F 8/77 717/126 |
| 2014/0331200 A1* | 11/2014 | Wadhwani | .......... | G06F 11/3604 717/101 |

* cited by examiner

*Primary Examiner* — Daxin Wu
(74) *Attorney, Agent, or Firm* — Van Pelt, Yi & James LLP

(57) ABSTRACT

A system for application monitoring includes an interface to receive an indication regarding an application. The system includes a processor to determine whether the application is compliant based at least in part on a set of policy rules, and in the event that the application is compliant, provide an indication that the application is compliant.

18 Claims, 7 Drawing Sheets

APPLICATION MONITORING USING WORKLOAD METADATA

CROSS REFERENCE TO OTHER APPLICATIONS

This application claims priority to U.S. Provisional Patent Application No. 62/202,066 entitled WORKLOAD METADATA filed Aug. 6, 2015 which is incorporated herein by reference for all purposes.

BACKGROUND OF THE INVENTION

An enterprise business typically employs thousands of developers creating and running software. When developers complete software, the software is deployed on application servers, possibly on many application servers around the globe. The enterprise wants to accelerate the process of innovation in software development by empowering developers to deploy software rapidly, without being burdened by slow verification processes. However, the enterprise is subject to rules (e.g., regulations) requiring all deployed software be compliant at all times. The complexity of the rules creates a problem where checking software for compliance is very difficult, slowing the processes of software development and installation.

BRIEF DESCRIPTION OF THE DRAWINGS

Various embodiments of the invention are disclosed in the following detailed description and the accompanying drawings.

DETAILED DESCRIPTION

Figure 1:
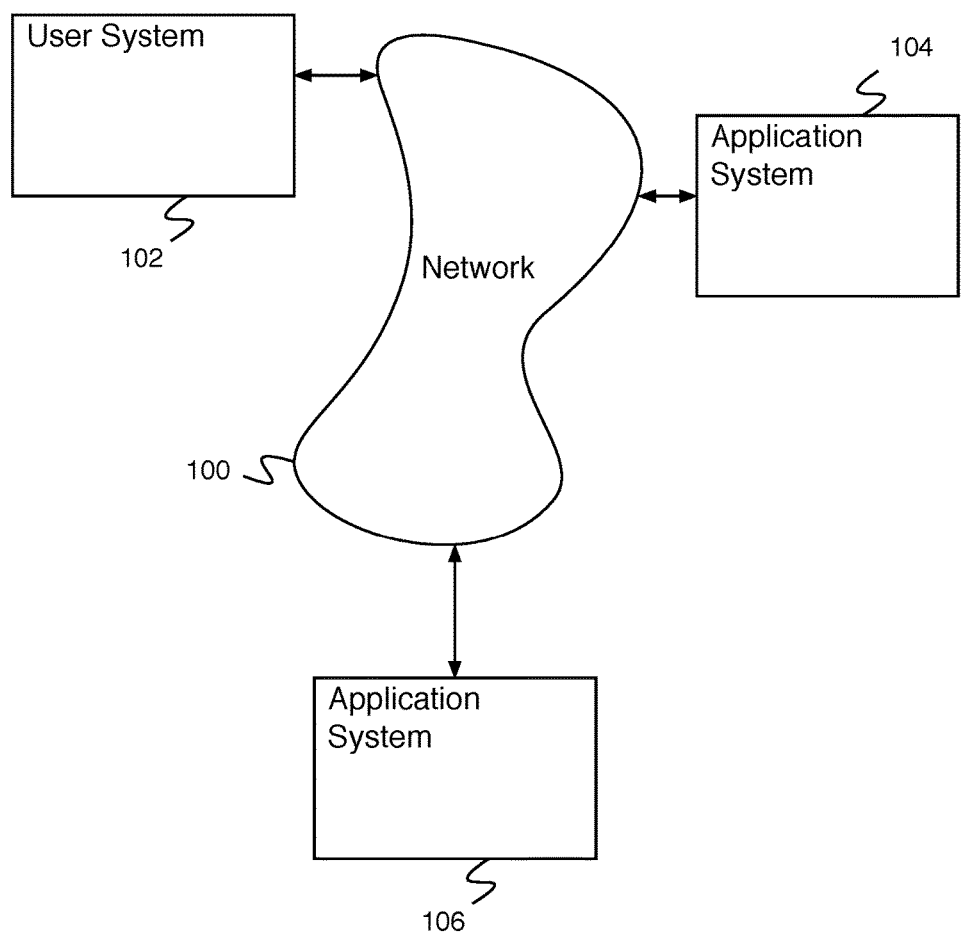
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for application monitoring comprises an interface and a processor. The interface is configured to receive an indication regarding an application. The processor is configured to determine whether the application is compliant based at least in part on a set of policy rules, and in the event that the application is compliant, provide an indication that the application is compliant. In some embodiments, the system for monitoring policy comprises a memory coupled to the processor and configured to provide the processor with instructions.

In some embodiments, a system for application monitoring comprises an automated system for determining whether an application is compliant with a policy. The system for application monitoring comprises a data model for application metadata and a query language for interacting with the data model. Policy rulesets can be encoded into the query language and applied to the application metadata by an authorization engine. The rules are stored in a policy storage system and queried when an application is installed or run, or when an overall system audit is performed. Application metadata is received from the developer along with the application as it is installed. Further application metadata is determined from the running application. The application metadata is stored in a metadata storage system. Each application is associated with an application compliance identifier that is stored in the metadata storage system associated with the application metadata so that the application metadata can be identified. A policy engine receives the policy rules from the policy storage system and application metadata from the metadata storage system. The policy engine then applies the rules to the metadata to determine whether the application is in compliance. In various embodiments, in the event that the application is determined to be compliant, an indication is provided that the application is compliant, an indication is provided that the application is allowed to deploy, an indication is provided that the application is allowed to run, or any other appropriate indication is provided. In various embodiments, in the event that the application is determined not to be compliant, an indication is provided that the application is not compliant, an indication is provided that the application is not allowed to deploy, an indication is provided that the application is not allowed to run, or any other appropriate indication is provided. In various embodiments, the indication causes an application to be allowed to run, to be enabled to run, to not be allowed to run, to be blocked from running, or any other appropriate action.

FIG. 1 is a block diagram illustrating an embodiment of a network system. In some embodiments, the network system of FIG. 1 comprises a system for monitoring policy. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, application system 104, and application system 106 communicate via network 100. In some embodiments, user system 102 comprises a computing system for a system user. In various embodiments, user system 102 comprises a client system for requesting computing jobs, for creating computing jobs, for managing an application system, for requesting a policy audit, or for any other appropriate purpose. In some embodiments, a computing system user interacts directly with user system 102. Application system 104 and application system 106 comprise application systems for providing applications. In some embodiments, application system 104 and application system 106 comprise application servers. In some embodiments, application system 104 and application system 106 comprise servers in addition to application servers (e.g., a policy enforcement server, a metadata storage server, etc.). In some embodiments, an application server comprises a server for providing applications. In some embodiments, applications provided by application server 104 and application server 106 are accessed by user system 102. In various embodiments, application system 104 and application system 106 comprise systems for providing business applications, systems for providing banking applications, systems for providing government applications, systems for providing scientific applications, systems for providing verifiable applications, systems for enforcing policy, systems for guaranteeing applications, or any other appropriate systems. In some embodiments, user system 102 comprises a processor and a memory. In various embodiments, user system 102 comprises a single-processor computer, a multiple-processor computer, a plurality of computers, a mobile computer, a tablet computer, or any other appropriate computer. In some embodiments, application system 104 and application system 106 each comprise a processor and a memory configured to store data and to provide instructions to the processor. In some embodiments, application system 104 and application system 106 each comprise a plurality of computers. In various embodiments, each of the one or more computers of application system 104 and application system 106 comprises a single-processor computer, a multiple-processor computer, a plurality of computers, a mobile computer, a tablet computer, or any other appropriate computer. In various embodiments, the system of FIG. 1 comprises 1, 2, 4, 9, or any other appropriate number of application systems.

Figure 2:
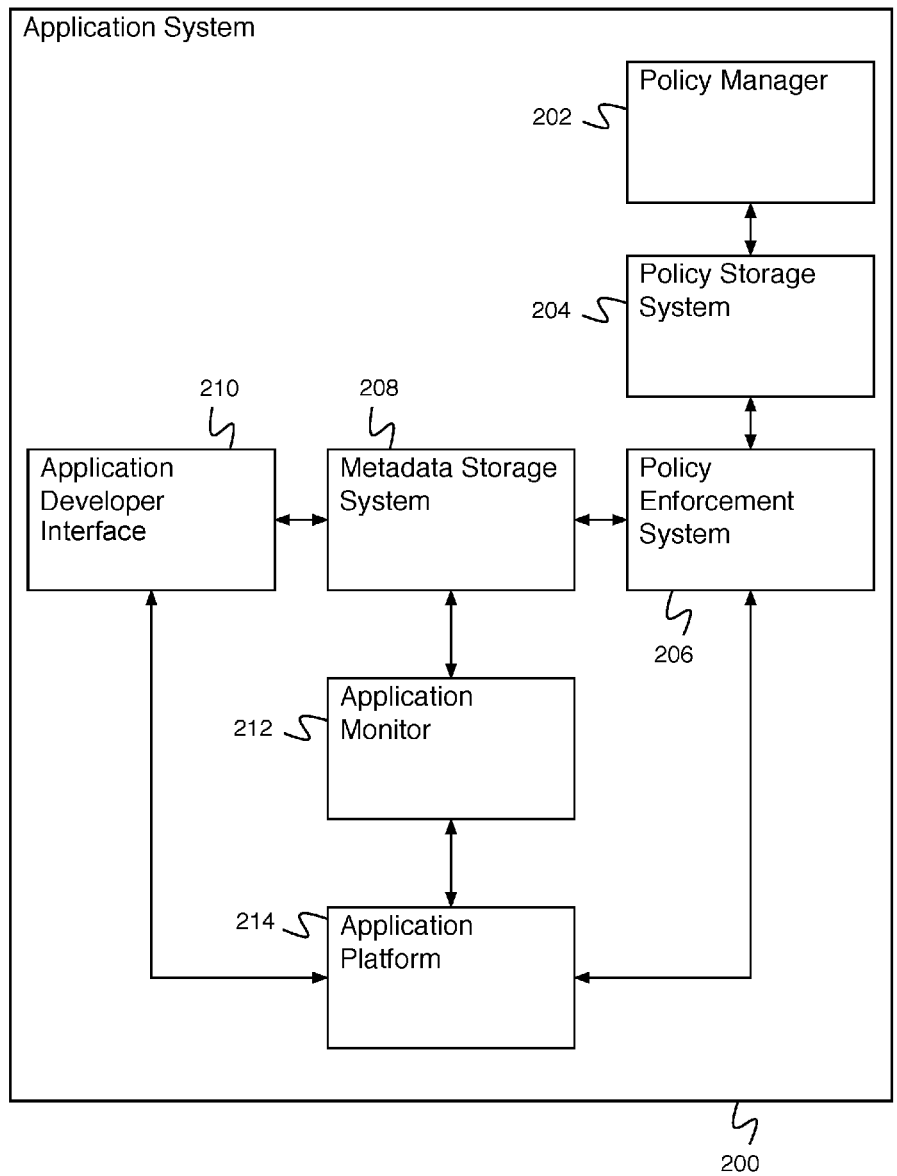
FIG. 2 is a block diagram illustrating an embodiment of an application system.

FIG. 2 is a block diagram illustrating an embodiment of an application system. In some embodiments, the application system of FIG. 2 comprises an application system of FIG. 1. In the example shown, application system 200 comprises policy manager 202. In some embodiments, policy manager 202 comprises a policy manager using a policy manager system. In some embodiments, policy manager 202 is in communication with a separate policy manager system. In some embodiments, policy storage system 204 receives a set of policy rules from policy manger 202. In some embodiments, a policy rule comprises a policy-based rule enforced on a software application. For example: "Software applications running in Asia that have a recovery time objective (e.g., RTO) of <20 min AND that have greater than 1,000 authorized users AND that process Personally Identifiable Information (e.g., PII) may not access machines outside of Asia AND may not store PII at rest outside of Asia." In some embodiments, policy rules are stored by policy storage system 204. In some embodiments, policy rules are verified by checking a set of metadata associated with an application. In some embodiments, metadata necessary to verify the exemplary policy rule comprises: server locations where the application is running, application recovery time objective, number of authorized users, whether the application processes personally identifiable information, locations of accessed servers, locations of personally identifiable information storage. In some embodiments, metadata comprises developer-specified metadata (e.g., application recovery time objective, whether the application processes personally identifiable information). In some embodiments, application developer interface 210 provides developer specified metadata to metadata storage system 208. In some embodiments, application developer interface 210 acts as an interface to an application developer using an application developer system. In some embodiments, application developer interface 210 provides and/or receives a communication to/from an application developer system. In some embodiments, metadata comprises workload-determined metadata (e.g., server locations where the application is running, locations of accessed servers). In some embodiments, application monitor 212 determines workload-determined metadata by monitoring parameters of an application running on application platform 214. In some embodiments, application developer interface 210 provides an application to application platform 214. In some embodiments, application platform 214 comprises an application platform for running applications. In some embodiments, application platform 214 comprises an application server. In some embodiments, application platform 214 communicates with policy enforcement system 206 to determine whether an application is allowed to run. In some embodiments, application platform 214 communicates with policy enforcement system 206 to determine whether an application is allowed to deploy. Policy enforcement system 206 comprises a policy enforcement system for enforcing a policy. In some embodiments, policy enforcement system 206 comprises a policy enforcement system for determining whether application metadata complies with a set of policies. In some embodiments, policy enforcement system 206 receives policies from policy storage system 204 and receives application metadata from metadata storage system 208. In various embodiments, policy enforcement system 206 determines whether an application is allowed to run, determines whether an application is allowed to deploy, determines whether an application is compliant, or determines any other appropriate policy determination. In some embodiments, policy enforcement system 206 loads policy rules from policy storage system 204 to be enforced at runtime.

Figure 3:
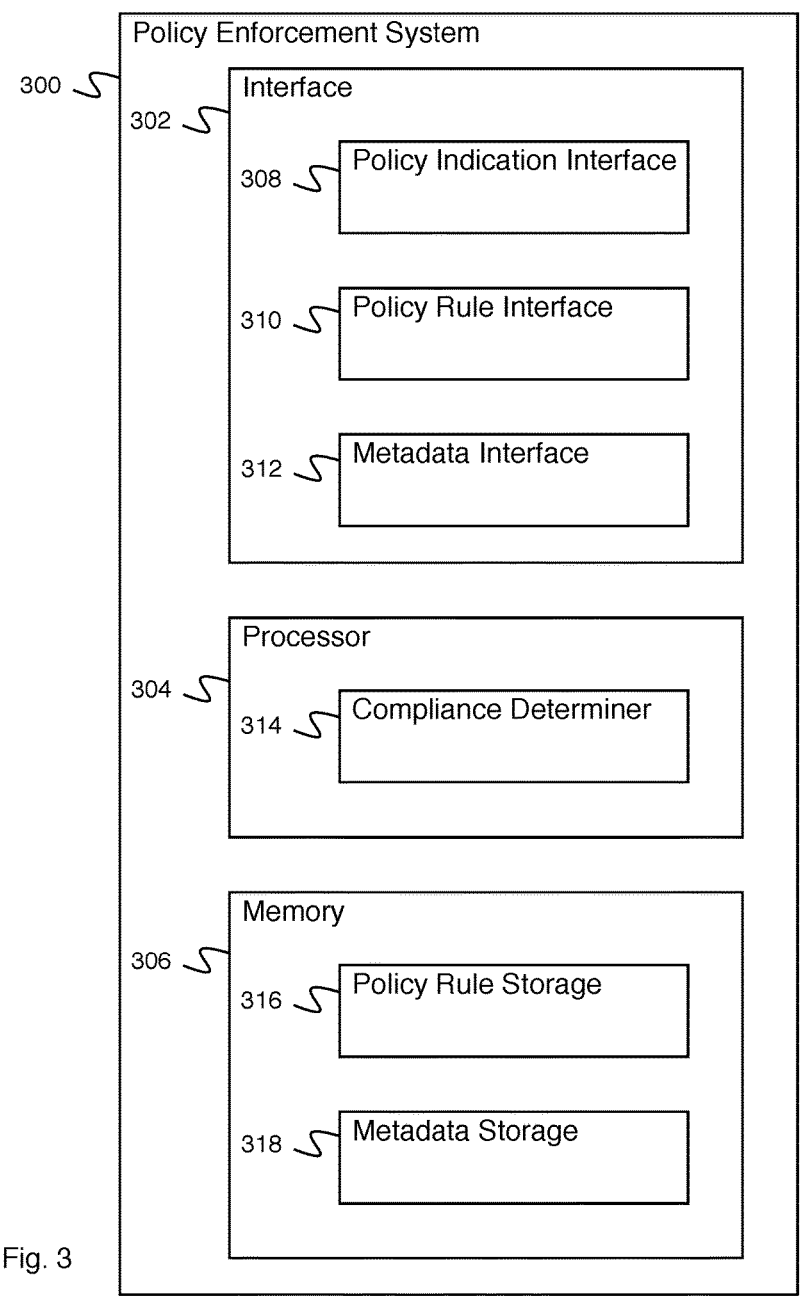
FIG. 3 is a block diagram illustrating an embodiment of a policy enforcement system.

FIG. 3 is a block diagram illustrating an embodiment of a policy enforcement system. In some embodiments, policy enforcement system 300 comprises policy enforcement system 206 of FIG. 2. In the example shown, policy enforcement system 300 comprises interface 302 for communicating with other systems (e.g., the other systems of FIG. 2), processor 304 for processing data, and memory 306 for storing data. Interface 302 comprises policy indication interface 308. In some embodiments, policy indication interface 308 comprises an interface for receiving a policy indication (e.g., an indication to determine whether an application is complying with policy, an indication to determine whether an application can be deployed, and indication to determine whether an application can be run, etc.). Interface 310 additionally comprises policy rule interface 310 for receiving policy rules (e.g., from a policy storage system) and metadata interface 312 for receiving metadata (e.g., from a metadata storage system). For example, metadata received comprises information regarding an application, an application identifier, application data types, application execution location (e.g., which geographic location(s) the application runs in), application users (e.g., how many distinct users access the application), application code (e.g., which libraries and modules, at which versions are incorporated in the application), application criticality (e.g., business criticality of the application, measured in financial loss (for example, US dollars) per second of downtime), personally identifiable information status of application (e.g., whether the application processes or stores personally identifiable information (PII)), application service level objective (e.g., the required service level objective of the application—for example, five nines uptime), etc. In some embodiments, policy indication interface 308, policy rule interface 310, and metadata interface 312 comprise a single interface. Processor 304 comprises a processor for processing data. In the example shown, processor 304 comprises compliance determiner 314. In some embodiments, compliance determiner 314 comprises a compliance determiner for receiving a set of policy rules and a set of metadata and determining whether the application associated with the metadata complies with the set of policy rules. In some embodiments, compliance with policy rules is determined as a set of logical tests (e.g., determining whether a value is greater than or less than a threshold, determining whether two Boolean values match, determining whether a value is found in a list, etc.). Memory 306 comprises a memory for storing data. In the example shown, memory 306 comprises policy rule storage 316 for storing policy rules and metadata storage 318 for storing metadata. In some embodiments, memory 306 additionally stores working data, compliance results, etc. In various embodiments, memory 306 comprises one or more of a volatile memory, a non-volatile memory, a random-access memory, a semiconductor memory, an optical memory, a tape memory, a phase-change memory, or any other appropriate memory.

Figure 4:
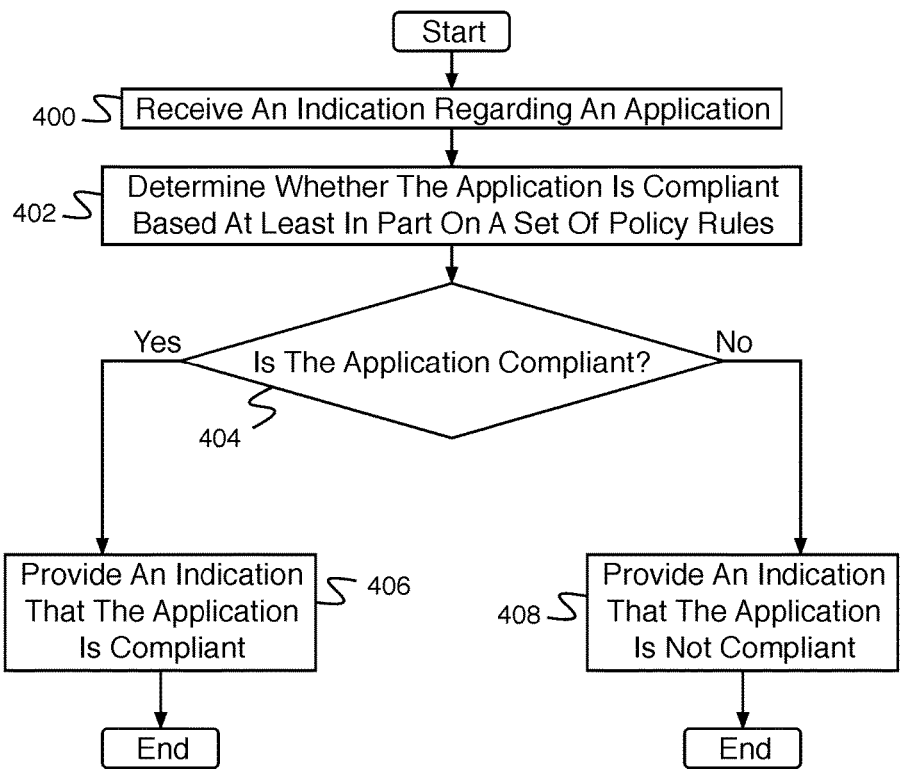
FIG. 4 is a flow diagram illustrating an embodiment of a process for determining compliance.

FIG. 4 is a flow diagram illustrating an embodiment of a process for determining compliance. In some embodiments, the process of FIG. 4 is executed by policy enforcement system 206 of FIG. 2. In the example shown, in 400, an indication regarding an application is received. In various embodiments, the indication comprises an indication to deploy an application, an indication to run an application, an indication to check policy compliance for an application, or any other appropriate indication. In 402, it is determined whether the application is compliant based at least in part on a set of policy rules. In 404, in the event the application is determined to be compliant, control passes to 406. In 406, an indication is provided that the application is compliant. In some embodiments, an indication that the application is compliant comprises an indication that the application is allowed to deploy. In some embodiments, an indication that the application is compliant comprises an indication that the application is allowed to run. The process then ends. In 404, in the event the application is determined to be not compliant, control passes to 408. In 408, an indication is provided that the application is not compliant. In some embodiments, an indication that the application is not compliant comprises an indication that the application is not allowed to deploy. In some embodiments, an indication that the application is not compliant comprises an indication that the application is not allowed to run. In some embodiments, an indication that an application is not compliant causes an application to be blocked from executing, to be not allowed to run, blocks an application from executing, does not allow an application to be executed, or any other appropriate action.

Figure 5:
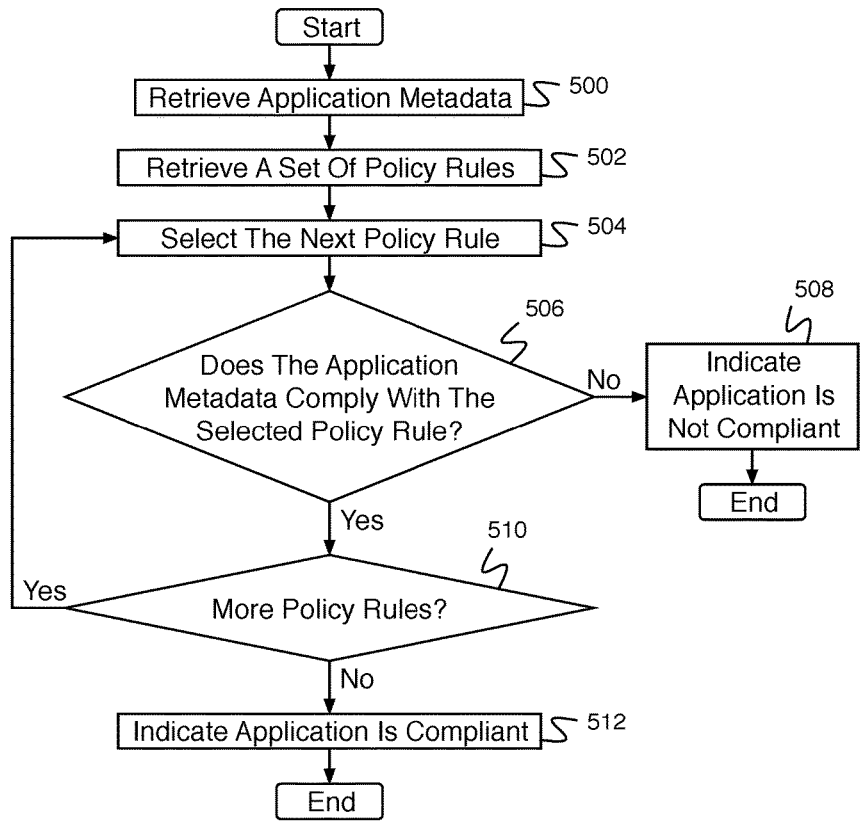
FIG. 5 is a flow diagram illustrating an embodiment of a process for determining whether an application is compliant based at least in part on a set of policy rules.

FIG. 5 is a flow diagram illustrating an embodiment of a process for determining whether an application is compliant based at least in part on a set of policy rules. In some embodiments, the process of FIG. 5 implements 402 of FIG. 4. In the example shown, in 500, application metadata is retrieved (e.g., from an application metadata storage). In 502, a set of policy rules are retrieved (e.g., from a policy storage system). In 504, the next policy rule is selected. In some embodiments, the next policy rule comprises the first policy rule. In 506, it is determined whether the application complies with the policy rule. In some embodiments, determining whether the application metadata complies with the selected policy rule comprises performing a set of logical tests on the metadata. In some embodiments, in the event there is no value stored for the metadata (e.g., the metadata comprises metadata determined from a running application and the application has not yet been run), the selected policy rule is ignored. In the event it is determined that the application metadata does not comply with the selected policy rule, control passes to 508. In 508, the process indicates that the application is not compliant, and the process ends. In the event it is determined in 506 that the application metadata complies with the selected policy rule, control passes to 510. In 510, it is determined whether there are more policy rules. In the event it is determined that there are more policy rules, control passes to 504. In the event it is determined that there are not more policy rules, control passes to 512. In 512, the process indicates the application is compliant.

Figure 6:
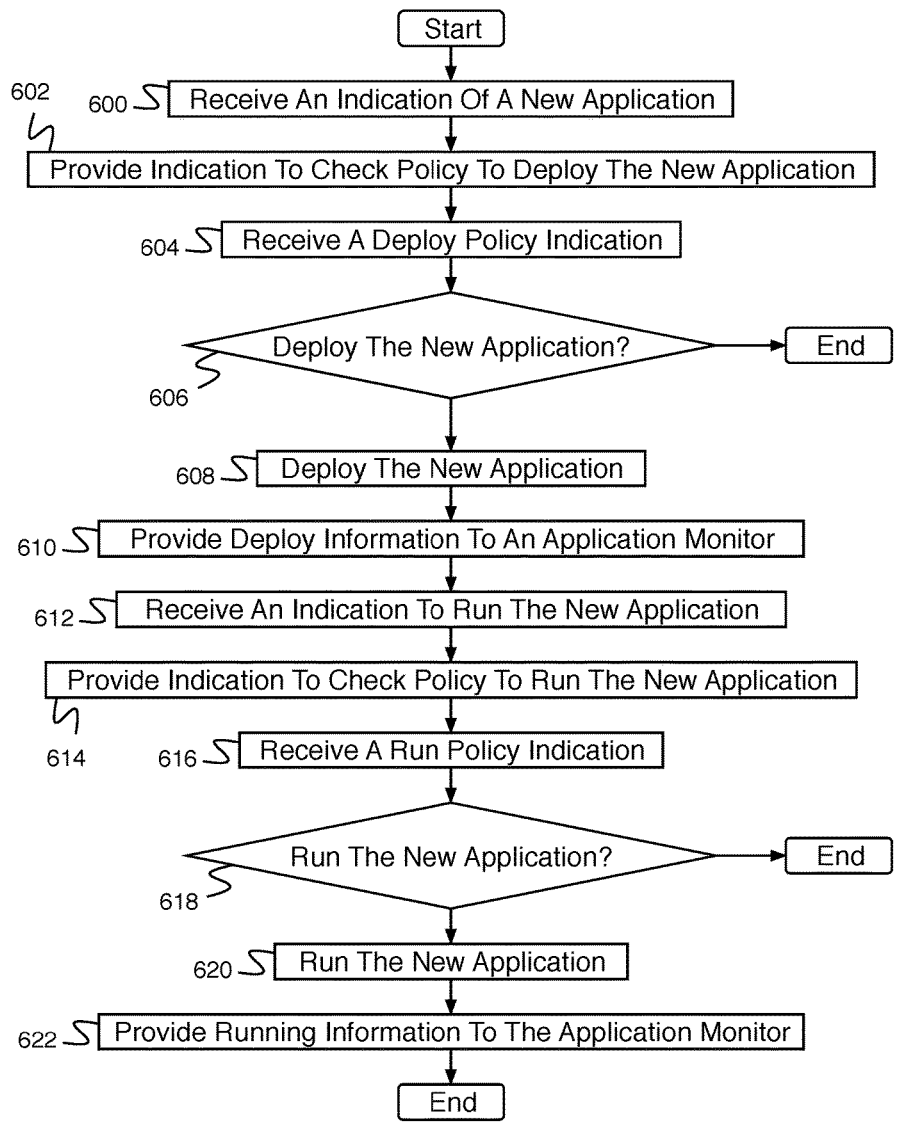
FIG. 6 is a flow diagram illustrating an embodiment of a process for installing an application.

FIG. 6 is a flow diagram illustrating an embodiment of a process for installing an application. In some embodiments, the process of FIG. 6 is executed by an application platform (e.g., application platform 214 of FIG. 2). In the example shown, in 600, an indication of a new application is received. In some embodiments, the indication of a new application is received from an application developer. In some embodiments, the indication of a new application comprises the new application. In some embodiments an application developer provides developer metadata to a metadata storage system when providing an indication of a new application to an application platform. In 602, an indication is provided to check policy to deploy the application. In some embodiments, the indication is provided to a policy enforcement system. In some embodiments, the policy enforcement system checks metadata stored in a metadata storage to determine a deploy policy indication. In 604, a deploy policy indication is received. In some embodiments, a deploy policy indication comprises an indication of whether policy rules allow the new application to be deployed. In 606, in the event it is determined not to deploy the new application, the process ends. In the event it is determined to deploy the new application, control passes to 608. In 608 the new application is deployed. In some embodiments, deploying the application comprises installing the application. In some embodiments, deploying the application comprises installing the application on one or more servers. In 610, deploy information is provided to an application monitor. In some embodiments, the application monitor uses the deploy information to add deploy metadata to a metadata storage system. In 612, an indication is received to run the new application. In 614, an indication is provided to check policy to run the application. In some embodiments, the indication is provided to a policy enforcement system. In some embodiments, the policy enforcement system checks metadata stored in a metadata storage to determine a run policy indication. In 616, a run policy indication is received. In 618, in the event it is determined not to run the new application, the process ends. In the event it is determined to run the new application, control passes to 620. In 620, the new application is run. In 622, running information is provided to the application monitor. In some embodiments, the application monitor uses the running information to add running metadata to a metadata storage system. In some embodiments, in the event a policy enforcement system receives an indication to check policy, the policy enforcement retrieves metadata from the metadata store, including developer metadata, deploy metadata, and running metadata.

Figure 7:
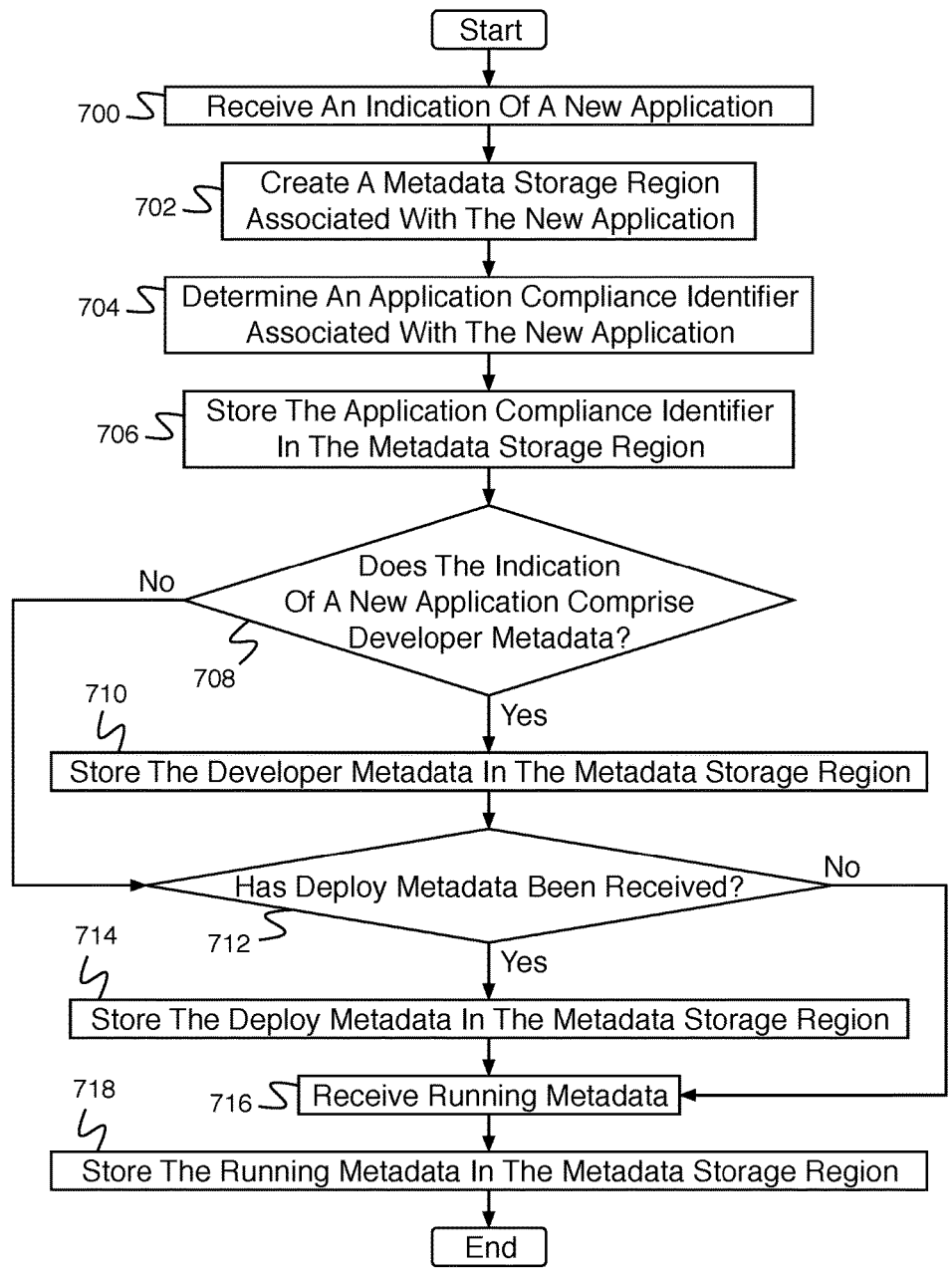
FIG. 7 is a flow diagram illustrating an embodiment of a process for storing metadata.

FIG. 7 is a flow diagram illustrating an embodiment of a process for storing metadata. In some embodiments, the process of FIG. 7 is executed by metadata storage system 208 of FIG. 2. In the example shown, in 700, an indication of a new application is received. In some embodiments, the new application comprises a new application being added by a developer to the application system. In some embodiments, the indication comprises developer metadata. In some embodiments, the new application comprises a legacy application (e.g., an application that already exists on the application server and is newly being added to the metadata storage system). In 702, a metadata storage region associated with the new application is created (e.g., a new directory for storing the metadata). In 704, an application compliance identifier associated with the new application is determined. In various embodiments, an application compliance identifier associated with the new application is determined from the application name, from a hash of the application executable code, from an application identifier table, from the application file path, or in any other appropriate way. In 706, the application compliance identifier is stored in the metadata storage region. In 708, it is determined whether the indication of a new application (e.g., the indication of a new application received in 700) comprises developer metadata. In the event it is determined that the indication of a new application does not comprise developer metadata, control passes to 712. In the event it is determined that the indication of a new application comprises developer metadata, control passes to 710. In 710, the developer metadata is stored in the metadata storage region. In 712, it is determined whether deploy metadata has been received. In some embodiments, deploy metadata comprises metadata determined upon application deployment. In some embodiments, in the event the process for storing metadata is initiated after the application is deployed (e.g., in the event of a legacy application), deploy metadata is not received. In the event it is determined that deploy metadata has not been received, control passes to 716. In the event it is determined that deploy metadata has been received, control passes to 714. In 714, the deploy metadata is stored in the metadata storage region. In 716, running metadata is received. In some embodiments, running metadata is received from an application monitor as the application is run. In 718, the running metadata is stored in the metadata storage region.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for application monitoring, comprising:
   an interface configured to receive an application indication regarding an application, wherein the application indication comprises a check indication to check policy compliance for the application;
   a processor configured to:
      receive a set of policy rules from a policy storage system;
      receive metadata associated with the application from a metadata storage system, wherein the metadata associated with the application comprises personally identifiable information status of the application, wherein the personally identifiable information status of the application comprises whether the application processes or stores personally identifiable information and locations of personally identifiable information storage;
      determine whether the application is compliant based at least in part on the set of policy rules, wherein determining whether the application is compliant comprises selecting a policy rule from the set of policy rules, performing a set of logical tests on the metadata, and comparing the policy rule with the personally identifiable information status of the application to determine whether the metadata complies with the policy rule, wherein the personally identifiable information status of the application is necessary to determine whether the metadata complies with the policy rule; and
      in response to a compliant determination that the application is compliant:
         provide a compliance indication that the application is compliant, wherein the compliance indication that the application is compliant causes the application to be allowed to run; and
      in response to a noncompliant determination that the application is not compliant:
         provide a noncompliance indication that the application is not compliant, wherein the noncompliance indication that the application is not compliant causes the application not to be allowed to run.

2. The system of claim 1, wherein the interface is further configured to receive the set of policy rules.

3. The system of claim 1, wherein the processor is further configured to cause storage of the set of policy rules in the policy storage system.

4. The system of claim 1, wherein the interface is further configured to receive the metadata associated with the application.

5. The system of claim 1, wherein the processor is further configured to cause storage of the metadata associated with the application in the metadata storage system.

6. The system of claim 1, wherein the processor is further configured to retrieve metadata associated with the application from the metadata storage system.

7. The system of claim 1, wherein the processor is further configured to:
   in response to the compliant determination that the application is compliant:
      provide a running indication that the application is allowed to run.

8. The system of claim 1, wherein the processor is further configured to:
   in response to the compliant determination that the application is compliant:
      provide a deploying indication that the application is allowed to deploy.

9. The system of claim 1, wherein the interface is further configured to receive an indication of monitored data describing operating characteristic of the application.

10. The system of claim 9, wherein the processor is further configured to retrieve the monitored data.

11. The system of claim 10, wherein the processor is further configured to store the monitored data.

12. The system of claim 11, wherein the monitored data is stored in the metadata storage system.

13. A method for application monitoring, comprising:
receiving an application indication regarding an application, wherein the indication comprises a check indication to check policy compliance for the application;
receiving a set of policy rules from a policy storage system;
receiving metadata associated with the application from a metadata storage system, wherein the metadata associated with the application comprises personally identifiable information status of the application, wherein the personally identifiable information status of the application comprises whether the application processes or stores personally identifiable information and locations of personally identifiable information storage;
determining, using a processor, whether the application is compliant based at least in part on the set of policy rules, wherein determining whether the application is compliant comprises selecting a policy rule from the set of policy rules, performing a set of logical tests on the metadata, and comparing the policy rule with the personally identifiable information status of the application to determine whether the metadata complies with the policy rule, wherein the personally identifiable information status of the application is necessary to determine whether the metadata complies with the policy rule; and
in response to a compliant determination that the application is compliant:
providing a compliance indication that the application is compliant, wherein the compliance indication that the application is compliant causes the application to be allowed to run; and
in response to a noncompliant determination that the application is not compliant:
providing a noncompliance indication that the application is not compliant, wherein the noncompliance indication that the application is not compliant causes the application not to be allowed to run.

14. A computer program product for application monitoring, the computer program product being embodied in a non-transitory computer readable storage medium and comprising computer instructions for:
receiving an application indication regarding an application, wherein the application indication comprises a check to check policy compliance for the application;
receiving a set of policy rules from a policy storage system;
receiving metadata associated with the application from a metadata storage system, wherein the metadata associated with the application comprises personally identifiable information status of the application, wherein the personally identifiable information status of the application comprises whether the application processes or stores personally identifiable information and locations of personally identifiable information storage;
determining whether the application is compliant based at least in part on the set of policy rules, wherein determining whether the application is compliant comprises selecting a policy rule from the set of policy rules, performing a set of logical tests on the metadata, and comparing the policy rule with the personally identifiable information status of the application to determine whether the metadata complies with the policy rule, wherein the personally identifiable information status of the application is necessary to determine whether the metadata complies with the policy rule; and
in response to a compliant determination that the application is compliant:
providing a compliance indication that the application is compliant, wherein the compliance indication that the application is compliant causes the application to be allowed to run; and
in response to a noncompliant determination that the application is not compliant:
providing a noncompliance indication that the application is not compliant, wherein the noncompliance indication that the application is not compliant causes the application not to be allowed to run.

15. The system of claim 1, wherein the processor is further configured to retrieve the set of policy rules from the policy storage system.

16. The system of claim 1, wherein the personally identifiable information status of the application comprises developer metadata provided to the metadata storage system from an application developer interface.

17. The system of claim 1, wherein the personally identifiable information status of the application comprises deploy metadata added to the metadata storage system by an application monitor.

18. The system of claim 1, wherein the personally identifiable information status of the application comprises running metadata added to the metadata storage system by an application monitor.

* * * * *